US010440055B2

(12) United States Patent
Allen et al.

(10) Patent No.: US 10,440,055 B2
(45) Date of Patent: Oct. 8, 2019

(54) APPARATUS AND METHOD FOR IMPLEMENTING NETWORK DECEPTION

(71) Applicant: The Johns Hopkins University, Baltimore, MD (US)

(72) Inventors: Patrick D. Allen, Columbia, MD (US); Steven A. Handy, Washington, DC (US); Aaron M. David, Elkridge, MD (US); James G. Castle, Olney, MD (US); Mark A. Matties, Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 210 days.

(21) Appl. No.: 15/662,910

(22) Filed: Jul. 28, 2017

(65) Prior Publication Data

US 2018/0103061 A1   Apr. 12, 2018

Related U.S. Application Data

(60) Provisional application No. 62/406,006, filed on Oct. 10, 2016.

(51) Int. Cl.
| | | |
|---|---|---|
| G06F 21/00 | (2013.01) |
| H04L 29/06 | (2006.01) |
| G06F 11/30 | (2006.01) |
| G06F 21/55 | (2013.01) |

(52) U.S. Cl.
CPC ........ *H04L 63/1491* (2013.01); *G06F 11/301* (2013.01); *G06F 21/552* (2013.01); *H04L 63/1416* (2013.01); *H04L 63/1425* (2013.01)

(58) Field of Classification Search
CPC ... H04L 63/1491; G06F 11/301; G06F 21/552
USPC ...................................................... 726/22–25
See application file for complete search history.

(56) References Cited

U.S. PATENT DOCUMENTS

| | | | | |
|---|---|---|---|---|
| 2004/0111636 A1* | 6/2004 | Baffes | ................. | G06F 21/554 726/23 |
| 2014/0115706 A1* | 4/2014 | Silva | ................. | H04L 63/1425 726/23 |
| 2017/0195364 A1* | 7/2017 | Levin | ................. | H04L 63/1491 |

* cited by examiner

*Primary Examiner* — Anthony D Brown
(74) *Attorney, Agent, or Firm* — Noah J. Hayward

(57) ABSTRACT

An example apparatus configured to perform network deception may include processing circuitry configured to generate virtual instances of decoy resources residing within a defined host network for presentation to cyber attackers, control at least one software defined network switch to monitor network traffic directed to real and decoy resources of the defined host network, and route network traffic based on detected interactions with the decoy resources. The decoy resources may have differing levels of decoy fidelity, where decoy fidelity indicates a difficulty for a cyber attacker to determine that the resource is a decoy. Additionally, generating the virtual instances of decoy resources may be performed without modification to real assets or real services residing in the defined host network. Furthermore, decoy services may be made to appear on real network assets using software defined networking without modification to the real assets or real services residing in the defined host network.

20 Claims, 7 Drawing Sheets

APPARATUS AND METHOD FOR IMPLEMENTING NETWORK DECEPTION

CROSS-REFERENCE TO RELATED APPLICATIONS

This application claims priority to and the benefit of prior-filed, U.S. Provisional Application No. 62/406,006 filed on Oct. 10, 2016, the entire contents of which are hereby incorporated herein by reference.

STATEMENT OF GOVERNMENTAL INTEREST

This invention was made with Government support under contract number N00024-13-D-6400 awarded by the Naval Sea Systems Command (NAVSEA). The Government has certain rights in the invention.

TECHNICAL FIELD

Example embodiments generally relate to network and data security and, more particularly, relate to apparatuses, systems, and methods for implementing defensive deceptive techniques direct against cyber-attacks.

BACKGROUND

Since the inception of interconnected networks such as the Internet, there has been concern about how to prevent attempts by hackers to infiltrate these networks to gain access to sensitive data and other resources. Numerous techniques to protect networks and the data stored within the networks. Many of these techniques may be robust in one area, but may be lacking in others. As such, improvements in the area of network and cyber defense and continued to be desirable.

BRIEF SUMMARY OF SOME EXAMPLES

According to some example embodiments, an apparatus configured to perform network deception is provided. The apparatus may comprise processing circuitry configured to generate virtual instances of decoy resources residing within a defined host network for presentation to cyber attackers. The decoy resources may be virtual instances of assets or services that are configured to attract cyber attackers into interaction with the decoy resources and at least one decoy resource may be generated using software defined networking. The processing circuitry may be further configured to control at least one software defined network switch to monitor network traffic directed to real and decoy resources of the defined host network, and route network traffic based on detected interactions with the decoy resources. The decoy resources may have differing levels of decoy fidelity, where decoy fidelity indicates a difficulty for a cyber attacker to determine that the resource is a decoy. Further, generating the virtual instances of decoy resources may be performed without modification to real assets or real services residing in the defined host network. Additionally, according to some example embodiments, decoy services may be made to appear on real network assets using SDN without modification to the real assets or real services residing in the defined host network.

Another example embodiment is a method for performing network deception. The method may comprise generating virtual instances of decoy resources residing within a defined host network for presentation to cyber attackers. The decoy resources may be virtual instances of assets or services that are configured to attract cyber attackers into interaction with the decoy resources. At least one decoy resource may be generated using software defined networking. The example method may further comprise controlling, by processing circuitry operating on a software defined network controller, at least one software defined network switch to monitor network traffic directed to real and decoy resources of the defined host network, and routing network traffic based on detected interactions with the decoy resources. The decoy resource may have differing levels of decoy fidelity, where decoy fidelity indicates a difficulty for a cyber attacker to determine that the resource is a decoy. Further, generating the virtual instances of decoy resources may be performed without modification to real assets or real services residing in the defined host network. Additionally, according to some example embodiments, decoy services may be made to appear on real network assets using SDN without modification to the real assets or real services residing in the defined host network.

BRIEF DESCRIPTION OF THE SEVERAL VIEWS OF THE DRAWING(S)

Having thus described example embodiments of the invention in general terms, reference will now be made to the accompanying drawings, which are not necessarily drawn to scale, and wherein:

DETAILED DESCRIPTION

Figure 1A:
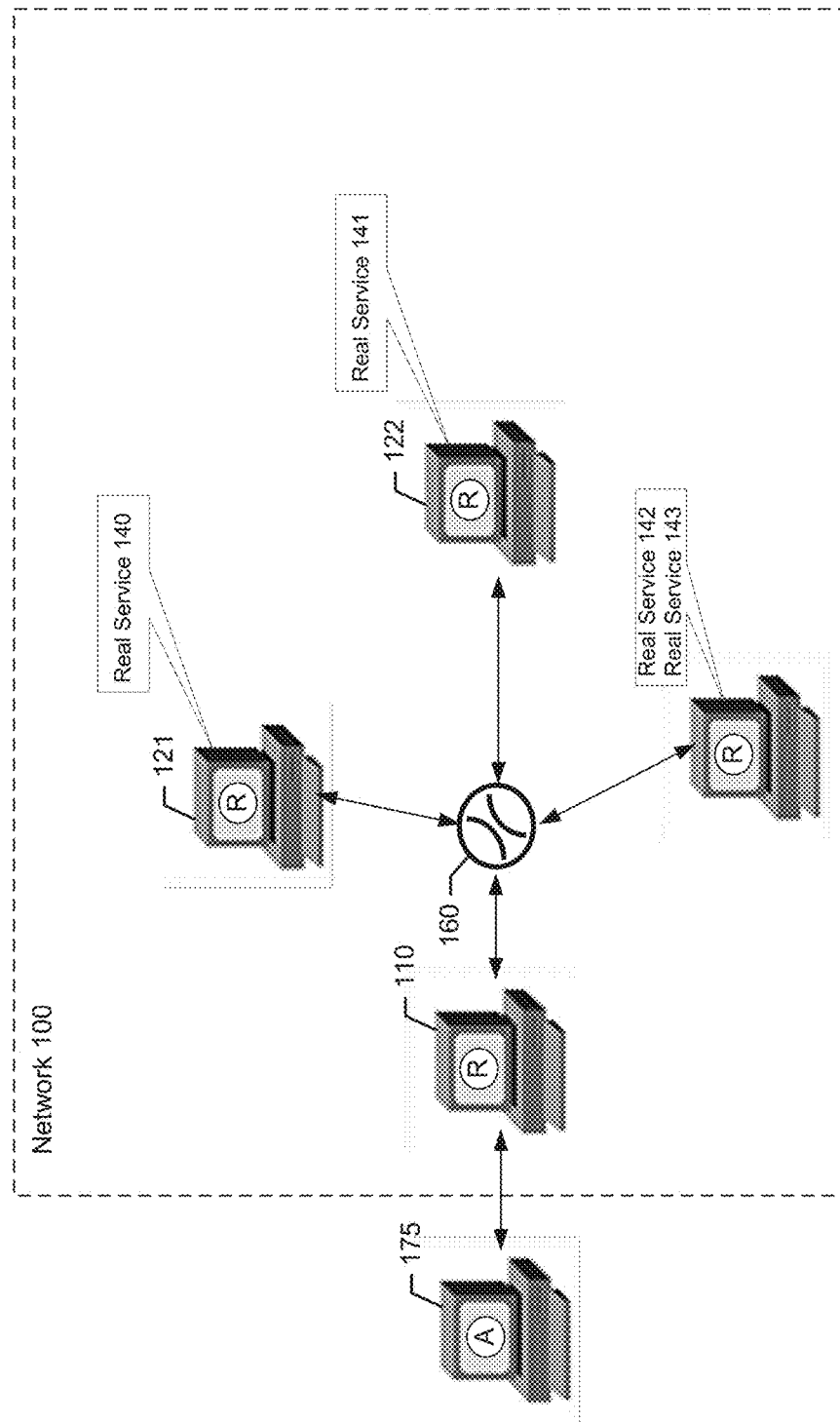
FIG. 1A shows an example legacy, non-SDN (Software Defined Networking) network that may be the target of a cyber attacker according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout.

According to some example embodiments, a software defined network (SDN) controller may be specially configured to implement network deception techniques towards potential cyber attackers. In this regard, the controller may be configured to operate an SDN switch that routes data traffic within the network 100, which may be a defined host network. The SDN controller, with the assistance of the SDN switch, may be configured to facilitate the generation of decoy resources by the decoy resource generation and management module, at differing levels of decoy fidelity, for interaction with potential network adversaries as further described herein.

FIG. 1A shows an example network 100 that could be a target of a cyber adversary 175. Cyber adversary 175 may be a network connected computing device that is capable of accessing the network 100 with malicious intent to perform a cyber attack by accessing sensitive data, introducing malware to the network 100, or the like. In this regard, the network 100 may be any collection of interconnected computing devices (e.g., computers, servers, routers, switches, etc.) using any technique for connecting the same. According to some example embodiments, the network 100 may be a local area network (LAN), a wide area network (WAN), wireless local area network (WLAN), metropolitan area network (MAN), SCADA over IP, or the like.

The network 100 may be comprised of a plurality of computing devices, where each device may operate as a real asset. As used herein, the term "real" refers to an asset or service that is being implemented to perform a requested task that is not related to network deception and not solely for the purpose of being a decoy. An asset may be, for example, a computing device operating as a physical machine, a virtual machine (VM), a container, a virtual interface, or the like.

The network 100, as an example, may include computing devices 110, 121, 122, and 123, each of which may be operating as real assets. These computing devices 110, 121, 122, and 123 may be connected via, for example, a network switch 160, which may be a legacy, non-SDN switch. In this regard, switch 160 will manage network behavior and control, for example, traffic on the network.

Further, each of the computing devices 110, 121, 122, and 123 may be configured to implement services. A service may be any type of executable action taken by the asset, such as, for example, running a network service such as telnet, an application or other processing task. As shown in FIG. 1A, computing device 121 may implement real service 140. Computing device 122 may implement real service 141. Finally, computing device 123 may implement real service 142 and real service 143.

As mentioned above, the cyber adversary 175 may be attempting to gain access to the network 100. In this regard, for example, the cyber adversary 175 may be attempting to gain access to the real assets and real services of network 100 via the computing device 110 as the initial access.

According to some example embodiments, network deception techniques may be implemented within the network 100. In this regard, an SDN controller and SDN switch may be introduced to the network 100 that are configured to implement, for example, a network deception and response toolkit (DART) of functionalities on the network 100. As such, the DART functionalities, which utilize SDN, may be implemented on, for example, virtual machines, replacing the functionality of legacy switch 160 and providing control to the switch. In their modified states, with reference to FIG. 1B, switch 160 may be referred to as DART-SDN switch 160' and the added controller may be referred to DART-SDN controller 161'. The Decoy Resource Generation and Management module 162' may be, for example, a network connected computer or other hardware that operates in coordination with the DART-SDN controller 161' and the DART-SDN switch 160' to produce the decoy assets and services The network 100 may be referred to as network 100' with the inclusion of DART-SDN switch 160', DART-SDN controller 161' and the Decoy Resource Generation and Management module 162'. According to some example embodiments, rather than operating on the switch 160, the DART-SDN switch 160' and the DART-SDN controller 161' may be implemented on other hardware that is separate from the switch 160, but still connected to the network 100' in a manner that at least some network traffic flows through DART-SDN switch 160'.

As such, DART-SDN switches and DART-SDN controllers can be retrofit for implementation on legacy, non-SDN networks without the need to require transitioning the full legacy network to SDN. The example network 100' may not currently operate using SDN, and may use legacy networking definition techniques. However, since, for example, the SDN switch 160' can run on a VM and the DART-SDN controller 161' can run on a VM, retrofitting the DART-SDN controller 161' and DART-SDN switch 160' capabilities to a legacy, non-SDN physical or virtual network may be implemented without requiring substantial changes to the legacy network. Further, running the DART-SDN switch 160' and DART-SDN controller 161' on VMs may allow for ease of installation. As such, retrofitting a DART-SDN controller and switches on any existing legacy network, even one that does not inherently use SDN, may be implemented, according to some example embodiments. Further, the use of SDN, according to some example embodiments, on a legacy, non-SDN network may be surprising to an adversary. As such, legacy, non-SDN networks may gain the benefits of implementing decoy resources on their network via the Decoy Resource Generation and Management module, according to some example embodiments, without having to convert the entire legacy, non-SDN network to SDN. In order to for real assets to appear to have decoy services, the legacy network traffic may need to be routed through the DART-SDN switch 160' that has access to DART-SDN controller 161'. If the legacy network includes a hypervisor, Network DART SDN-switches and SDN-controller can be added as VMs to existing hardware. If the legacy network does not include a hypervisor, a server running a hypervisor would need to be added to the network.

Accordingly, some of the techniques described herein may be leveraged in the context of a legacy network, such as network 100', that does not utilize SDN. However, a DART-SDN controller 161' and a DART-SDN switch 160' may be implemented, for example, on the same computing device. In this regard, together, the DART-SDN controller 161' and the DART-SDN switch 160' may be configured for installation ahead of the network 100' traffic in an effort to funnel network traffic through the DART-SDN controller 161' and the DART-SDN switch 160'.

Figure 1B:
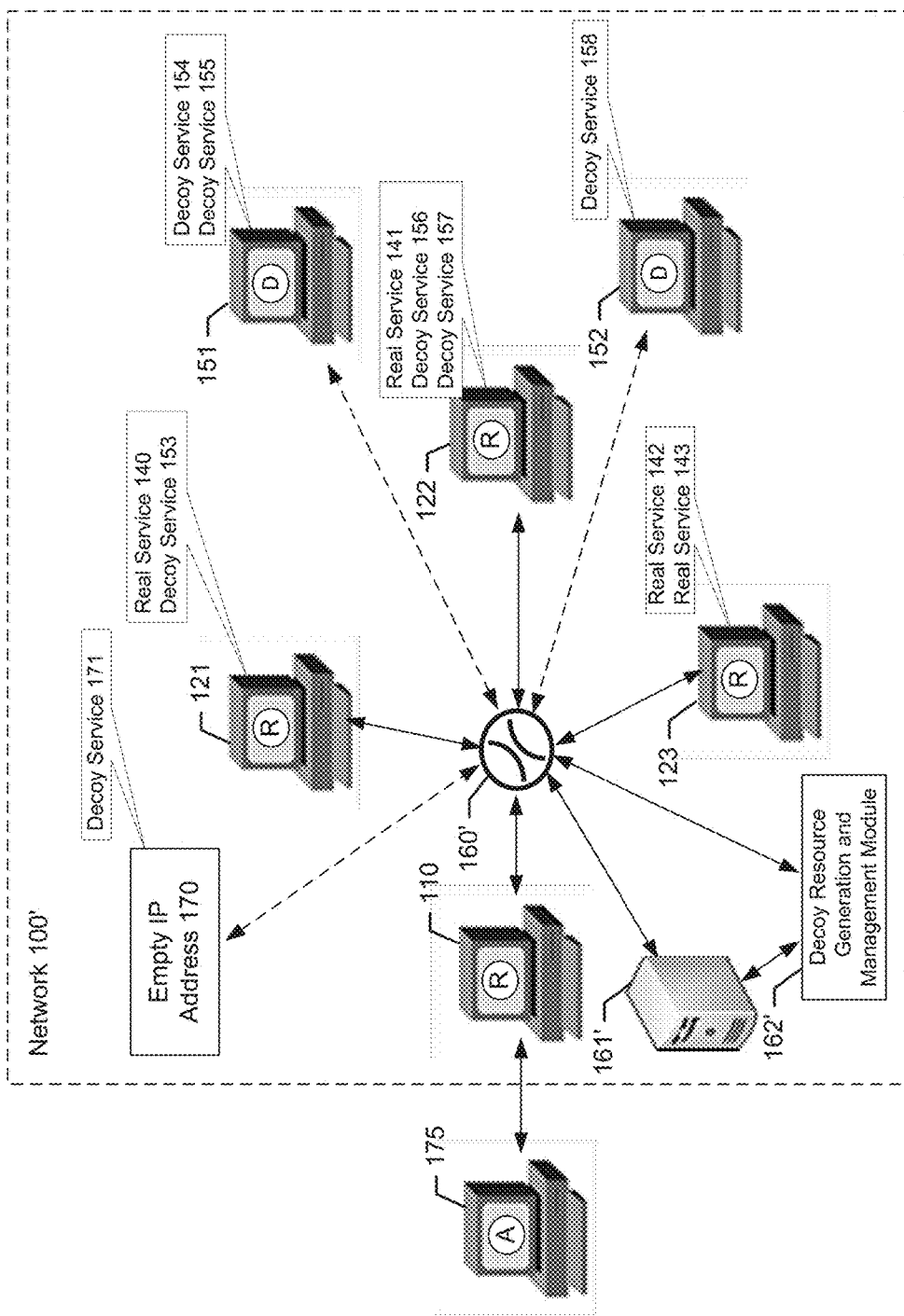
FIG. 1B shows an example legacy, non-SDN network with network deception implemented according to an example embodiment.

With more specific reference to the example network 100' as shown in FIG. 1B, an example architecture of decoy resources created by DART-SDN controller 161' is shown. In this regard, decoy computing devices 151 and 152, operating as decoy assets, have been introduced to the network 100' using the Decoy Resource Generation and Management module 162', which communicates with the SDN by the DART-SDN controller 161' and DART-SDN switch 160'. The decoy computing devices 151 and 152 may be, for example, hosts, data servers, printers, routers or other network assets. Further, the DART-SDN controller 161', DART-SDN switch 160' and the Decoy Resource Generation and Management module 162' together may generate decoy assets at empty IP addresses, such as empty IP address 170 on the network 100'.

Additionally, the Decoy Resource Generation and Management module 162' may generate a number of decoy services. In this regard, decoy services have been allocated to both decoy and real assets. Real computing device 121, operating as a real asset, may appear to be implementing not only real service 140, but also decoy service 153. Similarly, real computing device 122 may appear to be implementing decoy services 156 and 157, in addition to real service 141. Finally, real computing device 123 may simply be implementing real services 142 and 143.

With respect to the decoy assets, decoy computing device 151 may appear to be implementing decoy services 154 and 155. Decoy computing device 152 may appear to be implementing decoy service 158. Further, empty IP address 170 may appear to be implementing decoy service 171.

Figure 1C:
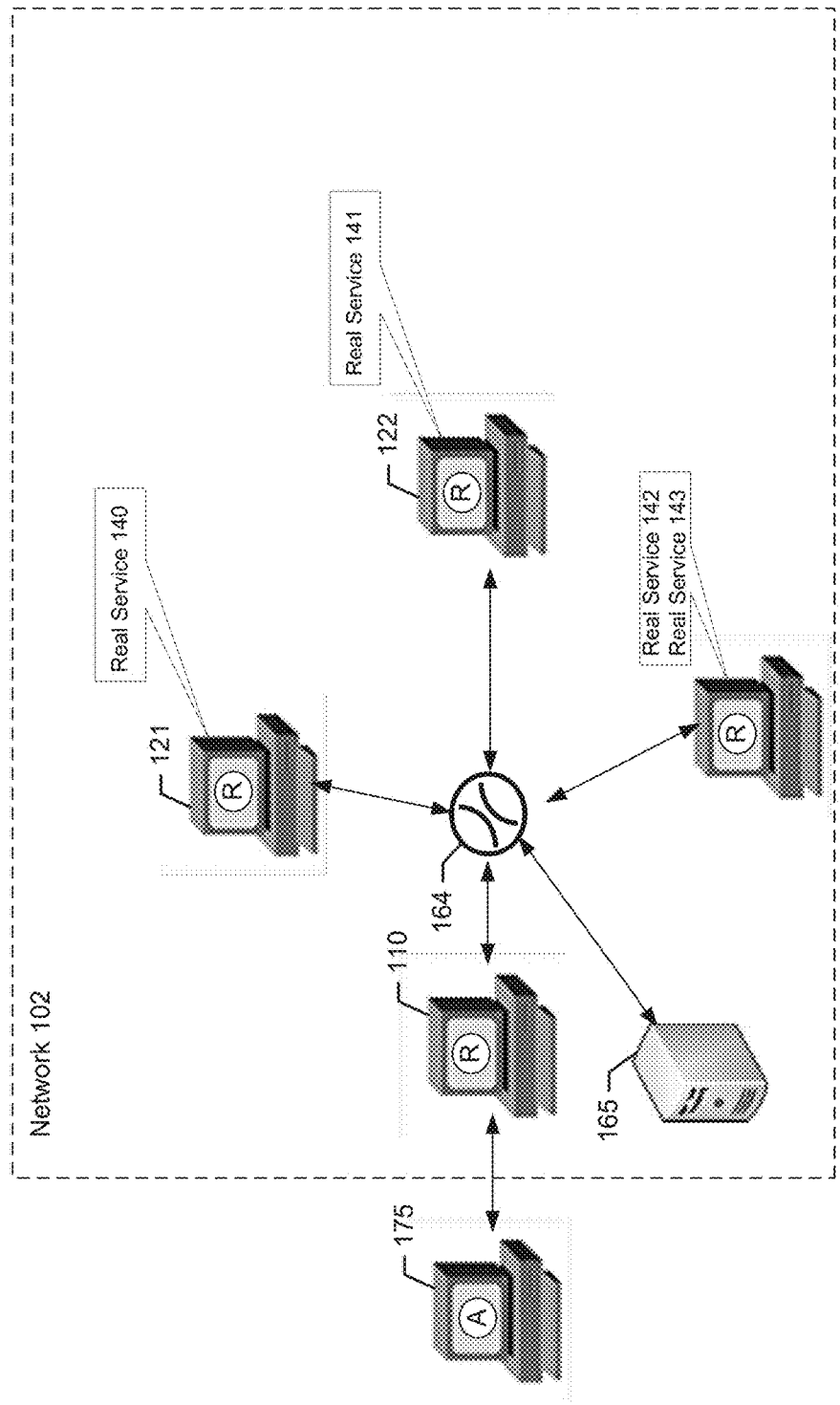
FIG. 1C shows an example SDN network that may be the target of a cyber attacker according to an example embodiment.

Following from FIGS. 1A and 1B, DART-SDN controllers and switches may also be configured to operate on SDN-based networks as well. In this regard, the example network 102 of FIG. 1C may be identical to the example network 100 of FIG. 1A, albeit with the exception that network 102 is an SDN network and uses SDN for management of the network 102 via SDN controller 165 and SDN switch 164. All other entities of the example network 102 may be identical the example network 100.

Figure 1D:
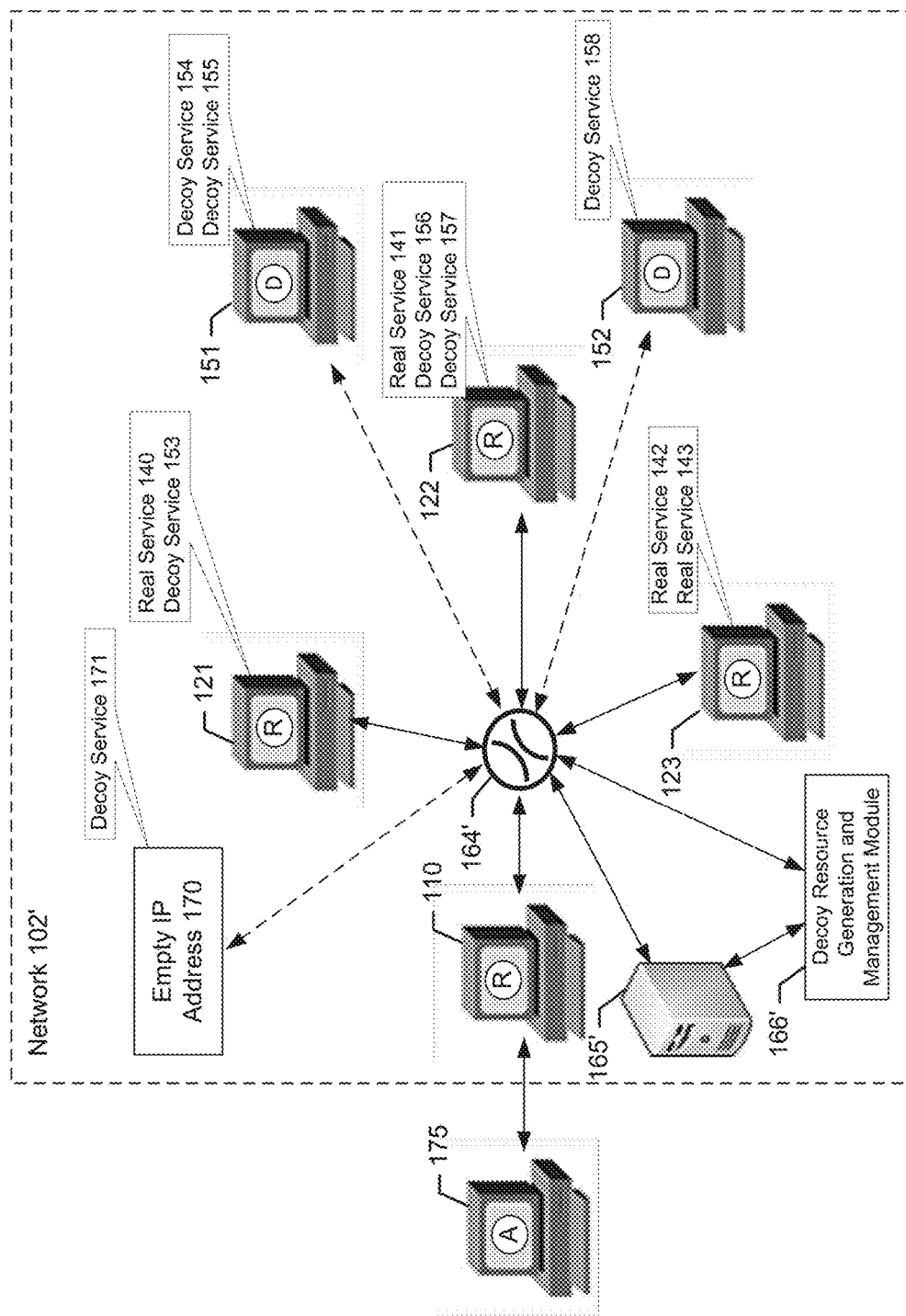
FIG. 1D shows an example legacy, SDN network with network deception implemented according to an example embodiment.

Similarly, with respect to FIG. 1D, a network 102' may be defined due to the modification of SDN switch 164 to be DART-SDN switch 164', SDN controller 165 to be DART-SDN controller 165', and the Decoy Resource Generation and Management module 166'. Accordingly, with the DART-modified SDN switch, DART-modified SDN controller and the Decoy Resource Generation and Management module in place, network 102 may be referred to as network 102'. Similar to DART-SDN Decoy Resource Generation and Management module 162', the Decoy Resource Generation and Management module 166' may generate all of the same example decoy assets and services, however, on the SDN-based network 102'.

With reference to the example legacy, non-SDN network 100' implementing DART-modified controllers and switches and the example SDN network 100' implementing DART-modified controllers and switches, various decoy resources may be defined to inhibit or thwart the efforts of the cyber adversary 175. Referring to both FIGS. 1B and 1D, according to some example embodiments, the Decoy Resource Generation and Management module 162', 166' may be configured to facilitate the implementation of network deception by constructing virtual decoys of resources that appear to be on the network 100', 102' from the perspective of the DART-SDN switch 160', 164', respectively, and therefore the cyber adversary 175. However, the decoy resources may merely be virtually created and generated though software defined networking. As such, the DART-SDN controller 161', 165', the DART-SDN Switch 160', 164', and the Decoy Resource Generation and Management module 162' and 166', may generate and deploy the decoy resources that appear to be alongside and upon real resources of the network 100', 102' without changing the configuration of real resources of the network 100', 102' or other host network. In this regard, the DART-SDN controller 161', 165' may be configured to interface with and control the DART-SDN switch 160', 164' and cause the DART-SDN switch 160', 164' to present an architecture of the network 100', 102' as including assets and services that are decoys in an effort to misdirect cyber adversary 175's efforts. Accordingly, when attempting to access various assets or services on the network 100', 102', the cyber adversary 175 may inspect the network 100', 102' and interact with the SDN switch 160', which may present the network 100 as including additional assets and services that are merely virtual decoys.

Attempts to interact with the decoy resources may be monitored by the DART-SDN controller 161', via the DART-SDN switch 160', to consider the possibility that a cyber attack is occurring and to route network traffic differently in response to detected threats.

By implementing the decoy resources as shown, for example, in the network 100', 102', cyber adversary 175 may have difficulty determining which assets are real and which are decoys. Using these SDN-based techniques implemented by the DART-SDN controller 161', 165' and DART-SDN switch 160', 164', cyber adversary 175 may be affected and its activities may be disrupted in all phases of the OODA (Observe-Orient-Decide-Act) loop performed by typical cyber adversaries. This may inhibit the cyber adversary 175's ability to execute exploitation operations on the network 100', 102'. The DART-SDN controller 161', 165' in coordination with the DART-SDN switch 160', 164' may use a combination of SDN traffic monitoring and manipulation or routing in relation to the decoy resources, and in particular decoy assets, such as, for example, VMs, containers, virtual interfaces and the like, to thwart the malicious efforts of the cyber adversary 175.

A cyber adversary, such as cyber adversary 175, may often be unable to effectively enumerate a defended network and differentiate decoy assets and decoy services from real assets and real services available in the network 100', 102'. As such, the inclusion of the decoy resources may at least create excessive time costs and inefficiencies that inhibit the cyber adversary's ability to exploit the network resources. Additionally, according to some example embodiments, interactions with decoy resources may be monitored by the DART-SDN controller 161', 165' via the DART-SDN switch 160', 164', and the DART-SDN controller 161', 165' may trigger an alert if interactions are detected because legitimate entities would not interact with decoy resources. For example, according to some example embodiments, a collection of decoy login credentials or paths to decoy resources (e.g., share drives) made available on the network 100', 102' for the cyber adversary to obtain and utilize. If those login credentials are accessed or used, then the DART-SDN controller 161', 165' can assume that those activities are being performed by a cyber adversary, such as cyber adversary 175. As such, a network administrator may be notified and may to take additional defensive or offensive actions against the detected adversary in response to such an alert. The decoy resources can, therefore, put cyber adversary 175's initial foothold, tools and techniques, as well as potential detection of their command and control infrastructure at risk of being discovered and thwarted.

As such, the Decoy Resource Generation and Management module 162', 166' may be configured to generate SDN-based lightweight decoy assets and specific decoy services that may appear to be interspersed in the same internet protocol (IP) space or network as the real, protected assets and services. Decoy resources may be generated at in a variety of manners such as at the asset (or host), at an IP address, or at individual services. Decoy services may be provided, not only on decoy assets, but additionally or alternatively, on empty IP addresses that are available on the network 100', 102', such as, for example, empty IP address 170. According to some example embodiments, decoy services may be made to appear on real assets without the real assets being changed or otherwise inhibited in any way, since the decoy services are merely made to appear via SDN. In this regard, the Decoy Resource Generation and Management module 162', 166' can therefore generate decoy resources that have differing levels of decoy fidelity as described in further detail with respect to FIG. 2 through the degree of interspersing of real resources with decoy resources. In addition, decoy content, such as fake credentials or paths to decoy assets and services, may be placed on both decoy assets and real assets.

As mentioned above, implementation of the decoys can create benefits by the disrupting the cyber adversary 175's operations tempo as it attempts to analyze the defended network 100', 102'. By routing suspect traffic on the network, DART-SDN controller 161', 165' may operate to keeping cyber adversaries, such as cyber adversary 175, away from real assets, real services, and real content, and, in particular, away from any actually vulnerable or sensitive real assets, services, or content, by occupying the cyber adversary 175's efforts towards a decoy resource instead. The DART-SDN controller 161', 165' may also be configured to log and archive activity on the network 100', 102' that may be suspected of being caused by a cyber adversary, such as cyber adversary 175. In this way, the DART-SDN controller 161', 165' may be configured to improve network situational awareness from early, high-confidence reporting of adversary activity on the network and determine where the adversary activity is coming from.

Accordingly, because the decoy resources are valid resources under SDN, an adversary would have difficulty distinguishing the decoy resources from the real resources. Because the decoy resources do not have an actual role in the operational or business functions of the defended network, legitimate entities would have no reason to interact with a decoy asset or decoy service, including a decoy service appearing to operate on a real asset.

As mentioned above, decoy assets may represent virtual machines (VMs), containers, virtual instances, virtual interfaces (Vis) or the like. Decoy services may be made to appear on any of these decoy assets, on empty network IP addresses, or even on real assets (e.g., physical or virtual hosts) without actually being implemented on the real assets. A DART-SDN controller (e.g., DART-SDN controller 161', 165') may, with the assistance of the DART-SDN switches (e.g., SDN switch 160', 164') or other DART-SDN controllers and switches, be configured to monitor traffic to select and implement rules to manipulate traffic and the appearances of the various types of decoy resources on the network (e.g., network 100), dynamically. Traffic manipulation capabilities may be performed, such as rerouting traffic, without an adversary being aware of the rerouting activity (e.g., zero failed login attempts). Further, according to some example embodiments, the Decoy Resource Generation and Management module 162' or 166' may be configured to also dynamically rename decoy resources by for example, swapping IP addresses or swapping MAC (media access control) addresses. Further, the Decoy Resource Generation and Management module 162', 166' may be configured to provide decoy resources, as well as traffic and response management to a network operator or administrator.

As indicated above, according to some example embodiments, real assets can be made to appear to have decoy services that the real assets are not actually implementing. Such a configuration may be generated without ever touching or modifying the real assets. The SDN switch may be leveraged to make real assets appear to have ports and services available that the assets do not actually have available.

For example, via the DART-SDN controller 161', 165', the DART-SDN Switch 160', 164', and the Decoy Resource Generation and Management module 162' and 166', some or all of the real network assets may appear to have telnet open in association with a decoy service when in fact no entity has telnet open. Similarly, when, for example, an adversary attempts to access the decoy services on a real asset, the adversary may, according to some example embodiments, be rerouted to a high fidelity decoy that also has that service running, without being aware that they did not reach the intended machine. According to some example embodiments, for real assets on a network to appear to have decoy services, the real network traffic may need to be routed through an DART-SDN switch 160', 164' that has access to the DART-SDN controller 161', 165'.

According to some example embodiments, the DART-SDN controller 161', 165' may also be configured to perform other functionalities to assist with network deception. In this regard, the DART-SDN controller 161', 165' may monitor and store some or all connection attempt details of the TCP (transmission control protocol) handshake (e.g., Syn, Syn-Ack, Ack) so that an adversary's first connection attempt may be successful, but is actually a connection to a decoy that has the correct certificates of a completed handshake. The rerouting capability may also be triggered on adversary attempts to speak to decoys by using only certain protocols.

According to some example embodiments, the DART-SDN controller 161', 165' and the SDN switch 160', 164' may use SDN traffic manipulation (or packet mangling) to obfuscate the results of network fingerprinting tools, such as making, for example, LINUX® assets appear to be WINDOWS® assets. As such, a larger number of potential light-weight but realistic decoys (e.g., containers and virtual interfaces) may be generated on a network that also has real Windows-based assets.

Further, as mentioned above, the DART-SDN controller 161', 165' and DART-SDN switch 160', 164' may have a set of monitoring and alert capabilities to warn an operator or administrator whenever adversary snooping has touched or otherwise interacted with a decoy resource, which legitimate users would not. Both the breadth and depth of scans and the number of rerouting events performed with the network by an entity may be tracked and reported to the network operator or administrator in an effort to identify malicious trends.

According to some example embodiments, the Decoy Resource Generation and Management module 162', 166' may use different approaches to managing assets, and network administrators may manage the decoy resources based on threats and apparent trends. According to some example embodiments, decoy resources may be managed via, for example, Ensemble, which is Ansible-based.

According to some example embodiments, the DART-SDN controller 161', 165' may operate at OSI (open systems interconnection) layers 2-4 (i.e., the data link layer, the network layer, and the transport layer) to provide finer control of decoy features. In addition, the Decoy Resource Generation and Management module can monitor traffic at the session layer (OSI layer 5). Further, generated decoy services may be, for example, SDN-based sensors and response systems that provide a level of granularity greater than decoy assets. Moreover, these decoy services may be placed to appear to exist on real assets as long as, according to some example embodiments, the network traffic is routed through an SDN switch (e.g., DART-SDN switch 160', 164') that connects to the DART-SDN controller 161', 165'.

Figure 2:
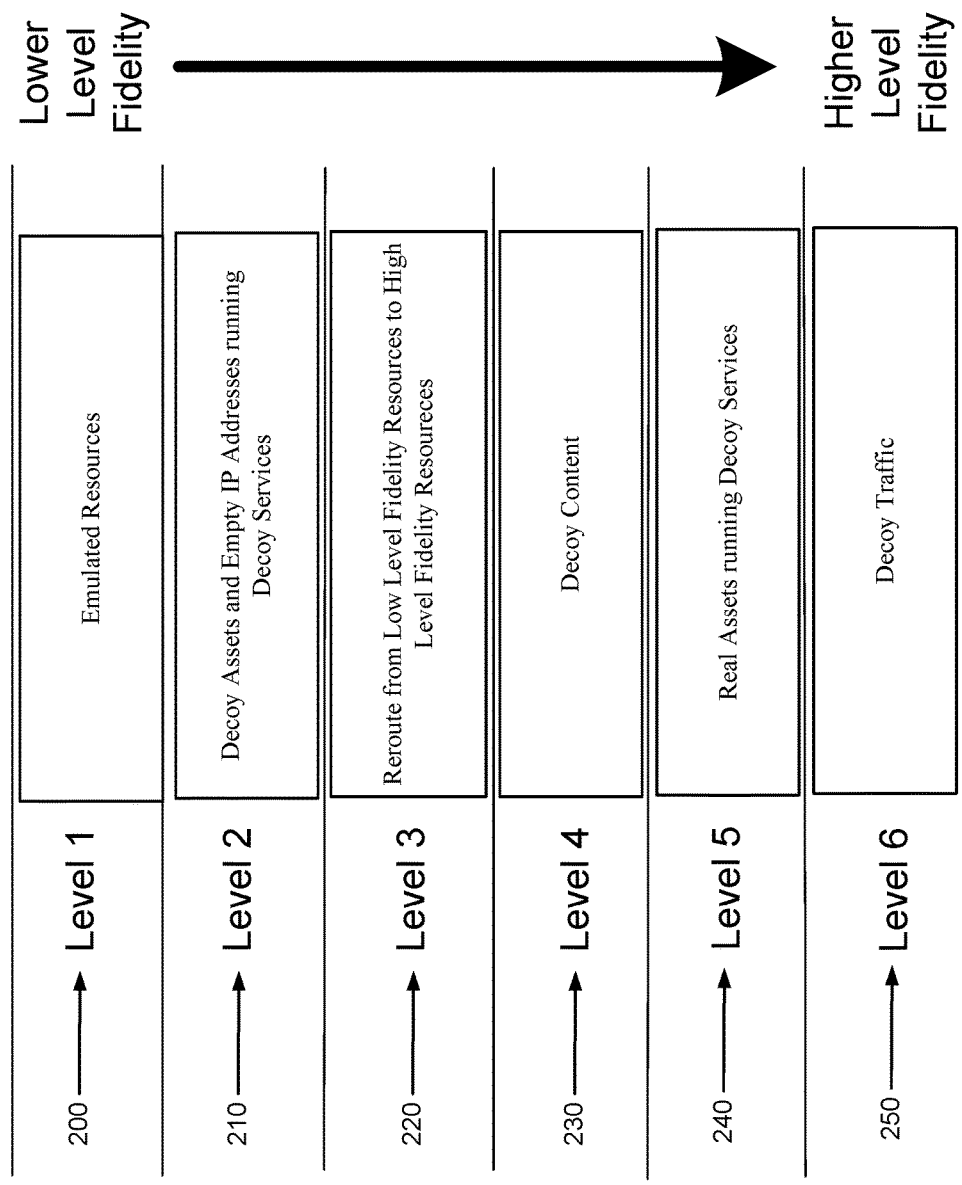
FIG. 2 shows a chart of differing levels of decoy fidelity according to an example embodiment.

Referring now to FIG. 2, a description of different levels of decoy fidelity that may be implemented by the DART-SDN controller 150 and DART-SDN switch 120 is provided, according to some example embodiments. Decoy fidelity may be an indication of the difficulty for a cyber adversary to determine that the resource is a decoy. In general, as decoys become more granular (i.e., decoy services are more granular than decoy assets) and the more interspersed with real resources, the difficulty of identifying a decoy is increased. In FIG. 2, the low fidelity features are at the top and the high fidelity features are at the bottom of FIG. 2.

As described above, according to some sample embodiments, decoy resources may be placed on a network prior to detection of cyber adversary activity. In this regard, according to some example embodiments, decoy resources may be in place before a cyber adversary is detected on the network, and additional, new decoy resources may be generated and placed on the network in response to observed adversary activity.

According to some example embodiments, at a relatively low fidelity end of the decoy fidelity spectrum as indicated by Level 1 at 200, decoy fidelity may involve the generation of emulated resources on, for example, VMs, containers, and VIs that emulate assets that may have emulated services. In this regard, emulated resources may be different from real or decoy resources because emulated resources have limited behaviors for interactions with adversaries and are not full-featured assets or services, as is the case with real and decoy resources. For example, the emulated resources may provide sufficient responses to cyber adversary activities as long as the expected response is in a response library of the emulation. Emulated resources, however, may be quickly identified by an adversary. According to some example embodiments, a DART-SDN controller that is operating on a network with emulated resources may generate an alert to notify, for example, the network administrator or defender that adversary activity with an emulated resource is likely present on the network.

At a next higher level of fidelity, e.g., Level 2 at 210, decoy assets in the form of, for example, VMs, containers, VIs and empty IP addresses may run or appear to run decoy services. Any adversary activity with these decoy resources may, according to some example embodiments, receive genuine responses expected from these assets and services. As a result, the decoy resources implemented in this manner will be more convincing to the adversary than the lower level fidelity approaches, and therefore keep the adversary busy fruitlessly interacting with the decoy resources for longer periods of time.

At the next higher level of fidelity, e.g., Level 3 at 220, functionalities may be employed (e.g., by the DART-SDN controller) to detect and reroute an adversary within the network from a real resource or a low-fidelity resource (e.g., an emulated resource) to a high-fidelity resource (e.g., a decoy asset running a decoy service). Additionally, for example, once identified, adversary activity with resources (e.g., emulated resources, decoy resources, and real resources), may be recorded and logged, including end point activity. Rerouting in this manner may, again, keep the adversary busy for even longer interacting with resources that are not at risk. Further, a cyber adversary may be rerouted away from low level fidelity decoys on any port or service to high level fidelity decoys with at least one similar service based on the needs of the network and the type of threat that has been detected.

According to some example embodiments, for fidelity Level 3 at 220, a DART-SDN controller (DART-SDN controller 161') may also be configured to perform other functionalities to assist with network deception. In this regard, as described above, a DART-SDN controller may monitor and store some or all connection attempt details of the TCP handshake details to permit, for example, an adversary's first connection attempt may be successful, but is actually a connection to a decoy resource that has the correct certificates of a completed handshake. The rerouting capability may also be triggered on adversary attempts to interact to decoy resources by using certain predefined protocols.

At the next higher level of fidelity, e.g., Level 4 at 230, an adversary may be lured or otherwise attracted to decoy content on a high-fidelity decoy asset (e.g., a decoy asset running a decoy service). A network administrator or defender may be notified of any interaction with decoy content. The decoy content on high fidelity decoys can include decoy documents such as business documents (e.g., word processing documents, spreadsheets, presentations, or the like) or other documents of interest. In addition, decoy content such as phony user credentials and paths may be employed that may lead an adversary to interact with decoy resources. In this regard, the decoy content may be placed not only on decoy resources, according to some example embodiments, decoy content may be placed or stored on real resources of the network.

At a next higher level of fidelity, e.g., Level 5 at 240, SDN may be used to present to an adversary decoy services running on real assets. In this regard, because SDN may be used at the DART-SDN controller and DART-SDN switch, the real assets need not be modified in any way. As indicated above, according to some example embodiments, real assets can be made to appear to have decoy services running on the real assets that the real assets are not actually implementing. Such a configuration may be generated without ever touching or modifying the real assets. Additionally, the DART-SDN switch may be leveraged to make real assets appear to have ports and services available that the assets do not actually have available.

Since a DART-SDN controller and a DART-SDN switch may be monitoring and manipulating OSI layers 2-4, and the Decoy Resource generation and Management module can monitor OSI layer 5 (session layer), as mentioned above, a finer control of decoy features may be implemented by making real assets appear to be running services that the real asset is actually not running. An adversary may therefore be attracted to a service that appears on an otherwise real asset, thereby further complicating an adversary's ability to gain situational awareness and increasing the chances of detecting the adversary. Further, generated decoy services may be, for example, SDN-based sensors and response systems that provide a level of granularity greater than decoy assets, as described above.

For example, as also described above, via a DART-SDN controller, as described herein, some or all of the real network assets may appear to have a particular protocol port open (e.g., telnet or the like) in association with a decoy service when an adversary attempts to interface with the decoy port, which may cause, for example, a rerouting to occur. Further, as described above, SDN traffic manipulation (or packet mangling) may be utilized to obfuscate the results of network fingerprinting tools, such as making, for example, LINUX® assets appear to be WINDOWS® assets.

According to some example embodiments, real assets in selected environments may appear to be suspected decoys to an adversary due to a mix of services that the asset is running, while, for example, a decoy asset may be running a more realistic set of services. Thus, a network that includes real assets that have a mix of services that would appears to be real, real assets that have a mix of services that appear to be decoys, decoy assets that have a mix of services that appear to be real, and decoy assets that have a mix of services that appear to be decoys creates a very complicated environment in which the adversary must attempt to operate.

At a next higher level of fidelity, e.g., Level 6 at 250, network traffic associated with decoy resources may be incorporated. With the addition of such decoy traffic, at least some decoy resources may appear to be real. Note that decoy assets at Level 2 above may utilize address resolution protocol (ARP) for communication and therefore appear as real assets if the adversary is checking ARP traffic. At this Level 6 of fidelity, simulated encrypted traffic appearing to be Internet Protocol Security (IPSEC) traffic or instead other simulated unencrypted traffic may be used to add to the fidelity of the decoy assets.

According to some example embodiments, having a mix of low and high fidelity decoy assets and services may be beneficial, creating confusion in the adversary. Many adversaries may detect low fidelity decoy resources and conclude that the decoy have been identified on the network. By using sets of decoy resources that include multiple levels of fidelity, the adversary will significant difficult being able to determine if the next, higher-fidelity asset is real or a decoy, thereby adding to the confusion of the adversary, and significantly increasing the probability that the adversary will be detected and rerouted to, for example, the highest-fidelity decoy resources.

Further, as mentioned above, the DART-SDN controller and DART-SDN switch may have a set of monitoring and alert capabilities to warn the an operator or administrator whenever adversary snooping has touched or otherwise interacted with a decoy resource, which legitimate users would not. Both the breadth and depth of scans and the number of rerouting events performed with the network by an entity may be tracked and reported to the network operator or administrator in an effort to identify malicious trends.

Figure 3:
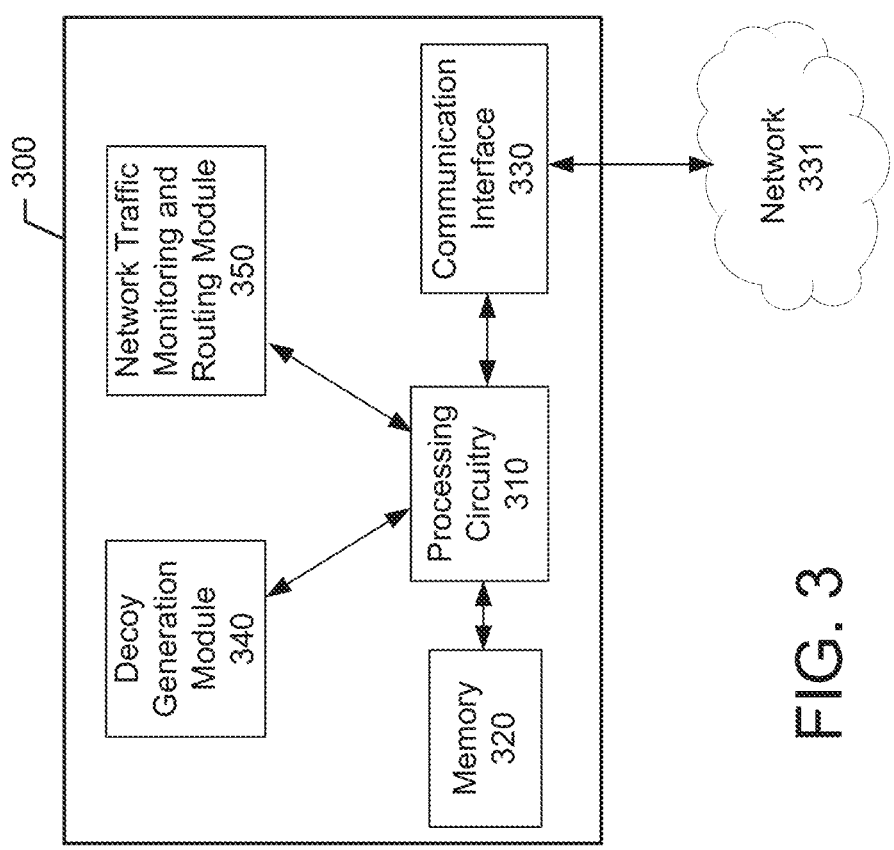
FIG. 3 shows an example apparatus for implementing network deception according to an example embodiment.

FIG. 3 provides an example of an apparatus 300 configured to implement network deception according to some example embodiments. According to some example embodiments, the apparatus 300 may be configured to perform the functionalities of the DART-SDN controller 161', 165' described above and otherwise herein.

Accordingly, FIG. 3 shows block diagrams of some internal components of an apparatus 300 that comprises processing circuitry 310 that may be in operative communication with a decoy generation module 340, a network traffic monitoring and routing module 350, a memory 320, and a communication interface 330. In particular, the decoy generation module (short for the Decoy Resource Generation and Management module) 340 and the network traffic monitoring and routing module 350 may include or otherwise be in communication with processing circuitry 310 that is configurable to perform actions in accordance with example embodiments described herein. According to some example embodiments, that decoy generation module 340 may operate external to the apparatus 300 utilizing processing circuitry that may coordinate operation with the processing circuitry 310, and thereby define processing circuitry located remote from each but can be collectively referred to as processing circuitry.

The processing circuitry 310 may be configured to perform computational processing, memory management, network management, or other processing and management services according to an example embodiment. In some embodiments, the processing circuitry 310 may be embodied as a chip or set of chips. In other words, the processing circuitry 310 may comprise one or more physical packages (e.g., chips) including materials, components or wires on a structural assembly (e.g., a baseboard). The processing circuitry 310 may be configured to receive inputs (e.g., via peripheral components including the memory 320, perform actions based on the inputs, and generate outputs (e.g., for provision to peripheral components).

In an example embodiment, the processing circuitry 310 may include one or more instances of a processor, associated circuitry, and memory 320. The processing circuitry 310 may be in communication with or otherwise control a user interface (not depicted) and communication interface 330. As such, the processing circuitry 310 may be embodied as a circuit chip (e.g., an integrated circuit chip) configured (e.g., with hardware, software or a combination of hardware and software) to perform operations described herein.

The communication interface 330 may include one or more interface mechanisms for enabling communication with other devices external to apparatus 300, via, for example, a network 331, such as a local area network. Network 331 may be a legacy, non-SDN network or an SDN network. According to some example embodiments, the network 331 may be network 100' or 102'. The communications interface 330 may be configure to, according to some example embodiments, to receive inbound network traffic and output the network traffic to appropriate network entities, as directed by the processing circuitry 310. In some cases, the communication interface 330 may be any means such as a device or circuitry embodied in either hardware, or a combination of hardware and software that is configured to receive or transmit data from/to devices in communication with the processing circuitry 310.

In an exemplary embodiment, the memory 320 may include one or more non-transitory memory devices such as, for example, volatile or non-volatile memory that may be either fixed or removable. The memory 320 may be configured to store information, data, applications, instructions or the like for enabling the decoy generation module 340 and the network traffic monitoring and routing module 350 to carry out various functions in accordance with exemplary embodiments. For example, the memory 320 could be configured to buffer input data for processing by the processing circuitry 310. Additionally or alternatively, the memory 320 could be configured to store instructions for execution by the processing circuitry 310. Among the contents of the memory 320, applications may be stored for execution by the processing circuitry 310 in order to carry out the functionality associated with each respective application. In some cases, the applications may include directions associated with the decoy generation module 340 and the network traffic monitoring and routing module 350.

The processing circuitry 310 may be embodied in a number of different ways. For example, the processing circuitry 310 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processing circuitry 310 may be configured to execute instructions stored in the memory 320 or otherwise accessible to the processing circuitry 310. As such, whether configured by hardware or by a combination of hardware and software, the processing circuitry 310 may represent an entity (e.g., physically embodied in circuitry—in the form of processing circuitry 310) capable of performing operations according to embodiments of the present invention while configured accordingly. Thus, for example, when the processing circuitry 310 is embodied as an ASIC, FPGA or the like, the processing circuitry 310 may be specifically configured hardware for conducting the operations described herein. Alternatively, as another example, when the processing circuitry 310 is embodied as an executor of software instructions, the instructions may specifically configure the processing circuitry 310 to perform the operations described herein.

In an example embodiment, the processing circuitry 310 may be embodied as, include or otherwise control the decoy generation module 340 and the network traffic monitoring and routing module 350. As such, in some embodiments, the processing circuitry 310 may be said to cause each of the operations described in connection with the decoy generation module 340 and the network traffic monitoring and routing module 350 to undertake the corresponding functionalities responsive to execution of instructions or algorithms configuring the processing circuitry 310 accordingly. For example, the processing circuitry 310 may provide programmable control signals, selections, and the like to control the operation of the apparatus 300 in accordance with the decoy generation module 340 and the network traffic monitoring and routing module 350 responsive to execution of instructions stored in the memory 320.

The decoy generation module 340 may be embodied in hardware of the processing circuitry 310 or embodied in the hardware of the processing circuitry as configured by instructions stored in the memory 320. In this regard, the decoy generation module 340 may be configured to generate virtual instances of decoy resources residing within a defined host network (e.g., network 331) for presentation to cyber attackers. The decoy resources may be virtual instances of assets or services that are configured to attract cyber attackers into interaction with the decoy resources. The decoy resources may have differing levels of decoy fidelity, which is an indication of a difficulty for a cyber attacker to determine that the resource is a decoy. Generating the virtual instances of decoy resources may be performed without modification to real assets or real services residing in the defined host network.

Further, the decoy resources may include decoy assets, and the decoy assets may include at least one of a container, a virtual machine, or a virtual interface. The decoy resources may include decoy services, and the decoy generation module 340 may be further configured to generate decoy services that appear to be operating on decoy assets. The decoy generation module 340 may also be configured to generate decoy content. The decoy resources may include decoy services, and the decoy generation module 340 may be further configured to generate decoy services that appear to be operating on real assets or decoy content that appear to be accessible from the real assets. The decoy resources may include decoy services, and the decoy generation module 340 may be further configured to generate decoy services that appear to be operating at empty network addresses.

According to some example embodiments, the decoy generation module 340 may be further configured to dynamically rename decoy resources. The decoy generation module 340 may also, according to some example embodiments, be further configured to make real assets appear to have ports and services that are decoys.

The network traffic monitoring and routing module 350 may be embodied in hardware of the processing circuitry 310 or embodied in the hardware of the processing circuitry as configured by instructions stored in the memory 320. In this regard, the network traffic monitoring and routing module 350 may be configured to control at least one software defined network switch, implemented on the apparatus 300 or remotely via the communication interface 330, to monitor network traffic directed to real and decoy resources of a defined host network (e.g., network 331).

The network traffic monitoring and routing module 350 may be configured to route network traffic based on detected interactions with the decoy resources. The network traffic monitoring and routing module 350 may be configured to route traffic that passes through a software defined network switch that is under the control of the apparatus 300 or a software defined network switch that is embodied on the apparatus 300.

According to some example embodiments, the network traffic monitoring and routing module 350 may be configured to maintain a log of interactions with the decoy resources and responses to the interactions with the decoy resources. Additionally or alternatively, according to some example embodiments, the network traffic monitoring and routing module 350 configured to route network traffic based on detected interactions with the decoy resources may be further configured to route traffic intended for decoy resources with a low level of decoy fidelity to decoy resources with a higher level of decoy fidelity.

According to some example embodiments, the defined host network (e.g., network 331) may be a legacy network that does not operate using software defined networking, and the at least one software defined network switch may be implemented by a virtual machine operating on the processing circuitry 310. Further, the network traffic monitoring and routing module 350 configured to route network traffic may include being configured to route network traffic at a data link, a network, and a transport layer.

Figure 4:
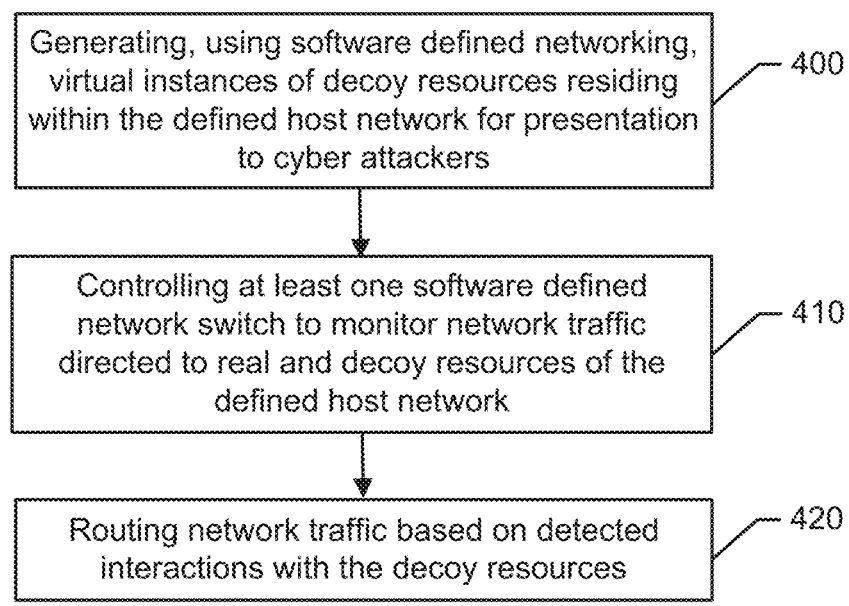
FIG. 4 shows flow chart of an example method for implementing network deception according to an example embodiment.

Referring now to FIG. 4, a block diagram of an example method for implementing network deception by, for example, the DART-SDN controller 161', 164', and/or the apparatus 300, and with the decoy generation module 340, is provided. In this regard, the example method may include, at 400, the example method may include generating, using software defined networking, virtual instances of decoy resources that appear to reside within a defined host network for presentation to cyber attackers. In this regard, the decoy resources may be virtual instances of assets or services that are configured to attract cyber attackers into interaction with the decoy resources. At 410, the example method may include controlling, by processing circuitry operating on a software defined network controller, at least one network switch to monitor network traffic directed to real and decoy resources of the defined host network. Further, at 420, the example method may include routing network traffic based on detected interactions with the decoy resources. The decoy resources may have differing levels of decoy fidelity, and the decoy fidelity may indicate a difficulty for a cyber attacker to determine that the resource is a decoy. Further, generating the virtual instances of decoy resources, at 410, may be performed without modification to real assets or real services residing in the defined host network.

According to some example embodiments, the decoy resources include decoy assets and the decoy assets may include at least one of a container, a virtual machine, or a virtual interface. The decoy resources may include decoy services, and the example method may further include generating decoy services that appear to be operating on decoy assets. The decoy resources may include decoy services, and the example method may further include generating decoy services that appear to be operating on real assets. The decoy resources may include decoy services, and the example method may further include generating decoy services that appear to be operating at empty network addresses.

According to some example embodiments, the example method may further include dynamically renaming decoy resources. The example method may further include, according to some example embodiments, maintaining a log of interactions with the decoy resources and responses to the interactions with the decoy resources. According to some example embodiments, routing network traffic based on detected interactions with the decoy resources, at 420, may include routing traffic intended for decoy resources with a low level of decoy fidelity to decoy resources with a higher level of decoy fidelity. Further, according to some example embodiments, the defined host network may be a legacy network that does not operate using software defined networking, and the at least one software defined network switch, e.g., DART-SDN switch 160', 164', may be implemented by a virtual machine operating on the processing circuitry.

According to some example embodiments, the example method may further include monitoring network activity against decoy resources or decoy content, and alerting network defenders of such activity. While most responses to detected adversary activity may be automated at the DART-SDN controller and switches, human network defenders may initiate additional responses through, for example, the decoy generation module 340, such as creating new decoy assets or new decoy services or decoy contents that appear to be of interest to the currently detected adversary. This may allow the network defender to perform selected generation of decoy resources dynamically, "on the fly" and then route network traffic based on the new decoy resources, at 420, as necessary.

As used herein, the term "module" is intended to include a computer-related entity, such as but not limited to hardware, software, or a combination of hardware and software. For example, a module may be, but is not limited to being a software or hardware implementation of a process, an object, an executable, and/or a thread of execution, which may be implemented via a processor or computer. By way of example, both an application running on a computing device and/or the computing device can be a module. One or more modules can reside within a process and/or thread of execution and a module may be localized on one computer and/or distributed between two or more computers. In addition, these modules can execute from various computer readable media having various data structures stored thereon. The modules may communicate by way of local and/or remote processes such as in accordance with a signal having one or more data packets, such as data from one module interacting with another module in a local system, distributed system, and/or across a network such as the Internet with other systems by way of the signal. Each respective module may perform one or more functions that will be described in greater detail herein. However, it should be appreciated that although such example is described in terms of separate modules corresponding to various functions performed, some examples need not necessarily utilize modular architectures for employment of the respective different functions. Thus, for example, code may be shared between different modules, or the processing circuitry itself may be configured to perform all of the functions described as being associated with the modules described herein. Furthermore, in the context of this disclosure, the term "module" should not be understood as a nonce word to identify any generic means for performing functionalities of the respective modules. Instead, the term "module" should be understood to be a modular entity that is specifically configured in, or can be operably coupled to, processing circuitry to modify the behavior and/or capability of the processing circuitry based on the hardware and/or software that is added to or otherwise operably coupled to the processing circuitry to configure the processing circuitry accordingly.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements or functions, it should be appreciated that different combinations of elements or functions may be provided by alternative embodiments without departing from the scope of the appended claims. In this regard, for example, different combinations of elements or functions than those explicitly described above are also contemplated as may be set forth in some of the appended claims. In cases where advantages, benefits or solutions to problems are described herein, it should be appreciated that such advantages, benefits or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An apparatus configured to perform network deception, the apparatus comprising:
    processing circuitry configured to:
    generate virtual instances of decoy resources residing within a defined host network for presentation to cyber attackers, wherein the decoy resources are virtual instances of assets or services that are configured to attract cyber attackers into interaction with the decoy resources, wherein at least one decoy resource is generated using software defined networking, and wherein the decoy resources include a first decoy resource and a second decoy resource;
    control at least one software defined network switch to monitor network traffic directed to real and decoy resources of the defined host network;
    detect an attempted interaction with the first decoy resource; and
    reroute network traffic intended for the first decoy resource to the second decoy resource, in response to detecting the attempted interaction with the first decoy resource;
    wherein the decoy resources have differing levels of decoy fidelity, wherein decoy fidelity indicates a difficulty for a cyber attacker to determine that the resource is a decoy; and
    wherein generating the virtual instances of decoy resources is performed without modification to real assets or real services residing in the defined host network.

2. The apparatus of claim 1, wherein the defined host network is a legacy network that does not operate using software defined networking, and wherein processing circuitry is configured to implement a software defined network controller and the at least one software defined network switch on one or more virtual machines, and the defined host network continues to operate as a legacy network that does not operate using software defined networking.

3. The apparatus of claim 1, wherein the decoy resources include decoy assets, and wherein the decoy assets include at least one of a container, a virtual machine, or a virtual interface.

4. The apparatus of claim 1, wherein the decoy resources include decoy services, and wherein the processing circuitry is further configured to generate decoy services that appear to be operating on decoy assets.

5. The apparatus of claim 1, wherein the decoy resources include decoy services, and wherein the processing circuitry is further configured to generate decoy services that appear to be operating on real assets.

6. The apparatus of claim 1, wherein the decoy resources include decoy services, and wherein the processing circuitry is further configured to generate decoy services that appear to be operating at empty network addresses.

7. The apparatus of claim 1, wherein the processing circuitry is further configured to dynamically rename decoy resources.

8. The apparatus of claim 1, wherein the processing circuitry is further configured to maintain a log of interactions with the decoy resources and responses to the interactions with the decoy resources.

9. The apparatus of claim 1, wherein the first decoy resource has a lower level of decoy fidelity than the second decoy resource.

10. The apparatus of claim 1, wherein the processing circuitry is further configured to make real assets appear to have ports and services that are decoys.

11. The apparatus of claim 1, wherein the processing circuitry configured to route network traffic includes being configured to monitor and route network traffic at a data link, a network, and a transport layer, and monitor traffic at the session layer.

12. A method for performing network deception, the method comprising:
generating virtual instances of decoy resources residing within a defined host network for presentation to cyber attackers, wherein the decoy resources are virtual instances of assets or services that are configured to attract cyber attackers into interaction with the decoy resources, wherein at least one decoy resource is generated using software defined networking, and wherein the decoy resources include a first decoy resource and a second decoy resource;
controlling, by processing circuitry operating on a software defined network controller, at least one software defined network switch to monitor network traffic directed to real and decoy resources of the defined host network;
detecting an attempted interaction with the first decoy resource; and
rerouting network traffic intended for the first decoy resource to the second decoy resource, in response to detecting the attempted interaction with the first decoy resource;
wherein the decoy resources have differing levels of decoy fidelity, wherein decoy fidelity indicates a difficulty for a cyber attacker to determine that the resource is a decoy; and
wherein generating the virtual instances of decoy resources is performed without modification to real assets or real services residing in the defined host network.

13. The method of claim 12, wherein the defined host network is a legacy network that does not operate using software defined networking, and wherein the method further comprises implementing a software defined network controller and the at least one software defined network switch on one or more virtual machines, and the defined host network continues to operate as a legacy network that does not operate using software defined networking.

14. The method of claim 12, wherein the decoy resources include decoy assets, and wherein the decoy assets include at least one of a container, a virtual machine, or a virtual interface.

15. The method of claim 12, wherein the decoy resources include decoy services, and wherein the method further comprises generating decoy services that appear to be operating on decoy assets.

16. The method of claim 12, wherein the decoy resources include decoy services, and wherein the method further comprises generating decoy services that appear to be operating on real assets.

17. The method of claim 12, wherein the decoy resources include decoy services, and wherein the method further comprises generating decoy services that appear to be operating at empty network addresses.

18. The method of claim 12, further comprising dynamically renaming decoy resources.

19. The method of claim 12, further comprising maintaining a log of interactions with the decoy resources and responses to the interactions with the decoy resources.

20. The method of claim 12, wherein the first decoy resource has a lower level of decoy fidelity than the second decoy resource.

* * * * *